US011163603B1

(12) United States Patent
Teich et al.

(10) Patent No.: US 11,163,603 B1
(45) Date of Patent: Nov. 2, 2021

(54) MANAGING ASYNCHRONOUS OPERATIONS IN CLOUD COMPUTING ENVIRONMENTS

(71) Applicant: International Business Machines Corporation, Armonk, NY (US)

(72) Inventors: Torsten Teich, Stuttgart (DE); Sugandha Agrawal, Stuttgart (DE); Daniel Pittner, Esslingen am Neckar (DE); Marc Schwind, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/921,381

(22) Filed: Jul. 6, 2020

(51) Int. Cl.
*G06F 9/46* (2006.01)
*G06F 9/48* (2006.01)
*G06F 9/50* (2006.01)
*H04L 29/08* (2006.01)
*H04L 12/917* (2013.01)

(52) U.S. Cl.
CPC ............ *G06F 9/485* (2013.01); *G06F 9/50* (2013.01); *H04L 47/76* (2013.01); *H04L 67/1095* (2013.01); *H04L 67/18* (2013.01); *G06F 2209/486* (2013.01)

(58) Field of Classification Search
CPC ...... G06F 9/485; G06F 9/50; G06F 2209/486; H04L 67/18; H04L 67/1095; H04L 47/76
See application file for complete search history.

(56) References Cited

U.S. PATENT DOCUMENTS

| 2019/0339955 A1 | 11/2019 | Kuo |
| 2019/0384655 A1 | 12/2019 | Krishna |
| 2020/0020398 A1 | 1/2020 | Miller |
| 2020/0045111 A1 | 2/2020 | Kannan |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

*Primary Examiner* — Adam Lee
(74) *Attorney, Agent, or Firm* — Kulsoom Hasan; Jared L. Montanaro

(57) ABSTRACT

A processor may execute an asynchronous operation of the program code, hibernate a process related to the asynchronous operation, and free-up related cloud runtime platform excluding the related system memory. Additionally, the processor may execute the asynchronous operation during the hibernation of the process, intercept an initiated completion function to the process after a completion of the asynchronous operation, inject at least one of additional program code and data into the completion function, unhibernating the process and reallocate freed-up cloud runtime platform related resources of the process, and execute the completion function returning result data of the asynchronous operation and the at least one of additional program code and data to the process.

18 Claims, 6 Drawing Sheets

MANAGING ASYNCHRONOUS OPERATIONS IN CLOUD COMPUTING ENVIRONMENTS

The disclosure relates generally to managing asynchronous operations in cloud computing environments, and more specifically, to execution of single-threaded, asynchronous I/O based program code on a serverless cloud runtime.

BACKGROUND

Cloud computing systems, environments, and frameworks have become mainstream in enterprise computing, often due to their flexibility in terms of resources and capital expenses. Additionally, a large number of programming and operation models have been developed and made available, often using open source, to explore the abilities of service-oriented architectures, virtual machines, stateless operation, and the option to operate the services without a server (e.g., serverless).

In a multi-tenant cloud environment, different workloads may compete for relevant resources at any time. Cloud workloads can be scaled out easily as the service executing the workload per definition is stateless. Depending on the workload pushed to the cloud computing environment, the cloud provider may have to scale out service instances and schedule resources such as virtual machines ("VM"). A typical distribution mechanism for incoming workloads may be to select the target resource (e.g., an underlying hardware system) with the least current workload.

Serverless, cloud-based computing is an execution model, where a cloud provider provides the physical or virtual computing resources. The resource distribution in such scenarios may also depend on the execution runtime being chosen, which could be of single-threaded or multi-threaded type. Clients may subscribe and use resources of the serverless computing environment, whereas the cloud provider may manage the allocation of the underlying infrastructure.

While advantageous for certain execution requirements, cloud-based computing can also have some disadvantages. One disadvantage is that different coding concepts may be required, e.g., program code may have to be adapted to concepts of the serverless framework primitives to be runnable in such an environment. One example may be a decomposition of the code into slices that represent a single execution cycle and chaining these slices together with other functions. Typically, existing programs cannot be run unmodified using a serverless compute model.

U. S. Patent Application Publication No. 2019/0339955 A1 describes technologies for creating a function checkpoint for an instance of a program code function located on a first service and using the function checkpoint to load the instance of the program code function on a second server.

Furthermore, U.S. Patent Application Publication No. 2019/0384655 A1 describes a method and a related system for processing data in serverless computing environments. In one embodiment, information related to functions associated with a plurality of serverless computing platforms and the data to be processed are received from data sources. Thereafter, processing operations required for processing the data are determined based on characteristics of data and domains related to the data. A target function for performing processing operations is identified based on evaluating confidence sources, and the target function is deployed by forwarding data to the serverless computing platform associated with the target function. In one embodiment, the requirement may eliminate the need to create and maintain servers by dynamically selecting an optimal serverless computing platform for processing the data.

However, there remains the need for a technique allowing program code which has been written in a single-threaded, asynchronous I/O based language to be used unmodified in a serverless computing framework.

SUMMARY

According to some aspect of the present disclosure, a computer-implemented method for execution of single-threaded, asynchronous I/O based program code on a serverless cloud runtime platform may be provided. The method may comprise executing an asynchronous operation of the program code, where the asynchronous operation is to be completed with a completion function. The method may include hibernating a process related to the asynchronous operation and freeing-up cloud runtime platform related resources of the process excluding the related system memory. The method may also comprise executing the asynchronous operation during the hibernation of the process, intercepting an initiated completion function to the process after a completion of the asynchronous operation, and injecting at least one of additional program code and data into the completion function.

Furthermore, the method may comprise un-hibernating the process and reallocating freed-up cloud runtime platform related resources of the process, and executing the completion function returning result data of the asynchronous operation and the at least one of additional program code and data to the process, thereby enabling the execution of the single-threaded, asynchronous I/O based program code on the serverless cloud runtime platform.

According to another aspect of the present disclosure, a runtime system for an execution of single-threaded, asynchronous I/O based program code on a serverless cloud runtime platform may be provided. The system may comprise a memory and a processor in communication with the memory. The processor may be configured to perform operations comprising: executing an asynchronous operation of the program code, where the asynchronous operation is to be completed with a completion function; hibernating a process related to the asynchronous operation; and freeing-up cloud runtime platform related resources of the process excluding the related system memory.

In some embodiments, the processor may be configured to perform operations comprising: executing the asynchronous operation during the hibernation of the process, intercepting an initiated completion function to the process after a completion of the asynchronous operation, and injecting at least one of additional program code and data into the completion function.

In some embodiments, the processor may be configured to perform operations comprising: un-hibernating the process and reallocating freed-up cloud runtime platform related resources of the process. In some embodiments, the processor may be configured to perform operations comprising: executing the completion function, returning result data of the asynchronous operation and at least one of the additional program code and data to the process, thereby enabling the execution of the single-threaded, asynchronous I/O based program code on the serverless cloud runtime platform.

The proposed computer-implemented method for execution of single-threaded, asynchronous I/O based program code on a serverless cloud runtime platform may offer multiple advantages, contributions, and technical effects.

As an example, a single-threaded program code of any type, e.g., a Node.JS program, may automatically be mapped to a serverless compute model by mapping execution slices to serverless invocations transparently. Hence, the present disclosure may allow an unmodified JavaScript program to be executed in the serverless environment for which it was not designed initially. The present disclosure brings the advantages of serverless computing also to more traditional single-threaded and more or less linearly designed program code.

The requirement to rewrite and redesign the single-threaded program code for a serverless computing environment has been eliminated so that from a user perspective the program code can now run indefinitely, while from the perspective of serverless computing it is still the pure serverless application. This provides two advantages: first, single-threaded programming languages, such as Node.JS and second, the advantage of serverless computing requiring less resources.

The method(s) of the present disclosure may also allow injecting arbitrary data and program logic into the original program code without the need to recompile or restructure the original single-threaded program. Examples of injected data may include (but are not limited to): cryptographic signatures signing the current data heap and profiling data which aids a performance analysis of the program code and in turn optimizes the placement dependent on the resulting load profile to specific serverless runtimes and clusters. Examples of injected program code may also include (but are not limited to): sending program execution status to an audit logging service.

Another advantage of the method(s) of the present disclosure is the ability to resume the interrupted single-threaded program on another cloud cluster or region, dependent on the availability of compute resources.

In some embodiments, the single-threaded, asynchronous I/O based program code may be written in a programming language selected from Node.JS, JavaScript, TypeScript and Golang or a comparable programming language. Thus, the present disclosure may be used together with almost any programming language supporting single-threaded, a synchronous I/O based programming styles.

In some embodiments, the un-hibernating—or resuming—may comprise executing a placement routine for resources for the process. Therefore, the resources required by the initiating program process that initiated the asynchronous operation may be re-established, thereby supporting the concept of serverless computing.

In some embodiments, the placement routine may be a function of a geographic availability of resources of the cloud runtime platform. Hence, by selecting useful configuration parameters for the placement routine, one may influence the geographic region in which the related service will be executed. This makes it possible to reduce network latency due to long distances between the calling and the called service.

In some embodiments, the placement routine may also comprise determining the resource placement of the process to be un-hibernated based on the location of the asynchronous operation. The location may be determined based on geographic coordinates, e.g., the resource placement may be chosen "close by" in order to avoid long-distance network connections between related services.

In some embodiments, the method may also comprise determining a resource placement for resources required by the asynchronous operation based on the location of the hibernated process. Geographic coordinates may also play a major role. This may guarantee that both services (in particular, the calling and the called) may run in the same cloud computing center.

In some embodiments, the serverless cloud runtime platform may be based on one of the following technologies: Docker, Containerd, Linux Containers, Podman Kubernetes, Knative, AWS Lambda, Google Cloud Functions, Azure Functions and Alibaba Cloud Function Compute. Additionally, other, similar serverless cloud runtime platforms may be used. Hence, the proposed concept may support basically any serverless cloud runtime framework.

In some embodiments, the asynchronous operation may be a long running asynchronous input/output (I/O) operation (e.g., a call to a filesystem, a database, or similar) a timer operation, or a wait operation for an input operation. However, it is noted that this may not apply to promises directly in serverless computing frameworks but to those comprising input/output. The same may apply to asynchronous wait operations; they are typically mapped to promises.

In some embodiments, the method may also comprise determining, by a placement routine having initiated (e.g., triggered) the execution of the asynchronous operation, a resource placement for the process to be un-hibernated based on the data classification associated with the asynchronous operation and the respective parameters. Thus, not only the code itself and potential metadata, but also the type of data associated with the asynchronous operation may be used to control the functioning of the resource placement. This may allow a fine-grained management of the stateless computing framework when used in the context of single-threaded, asynchronous I/O based program code.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
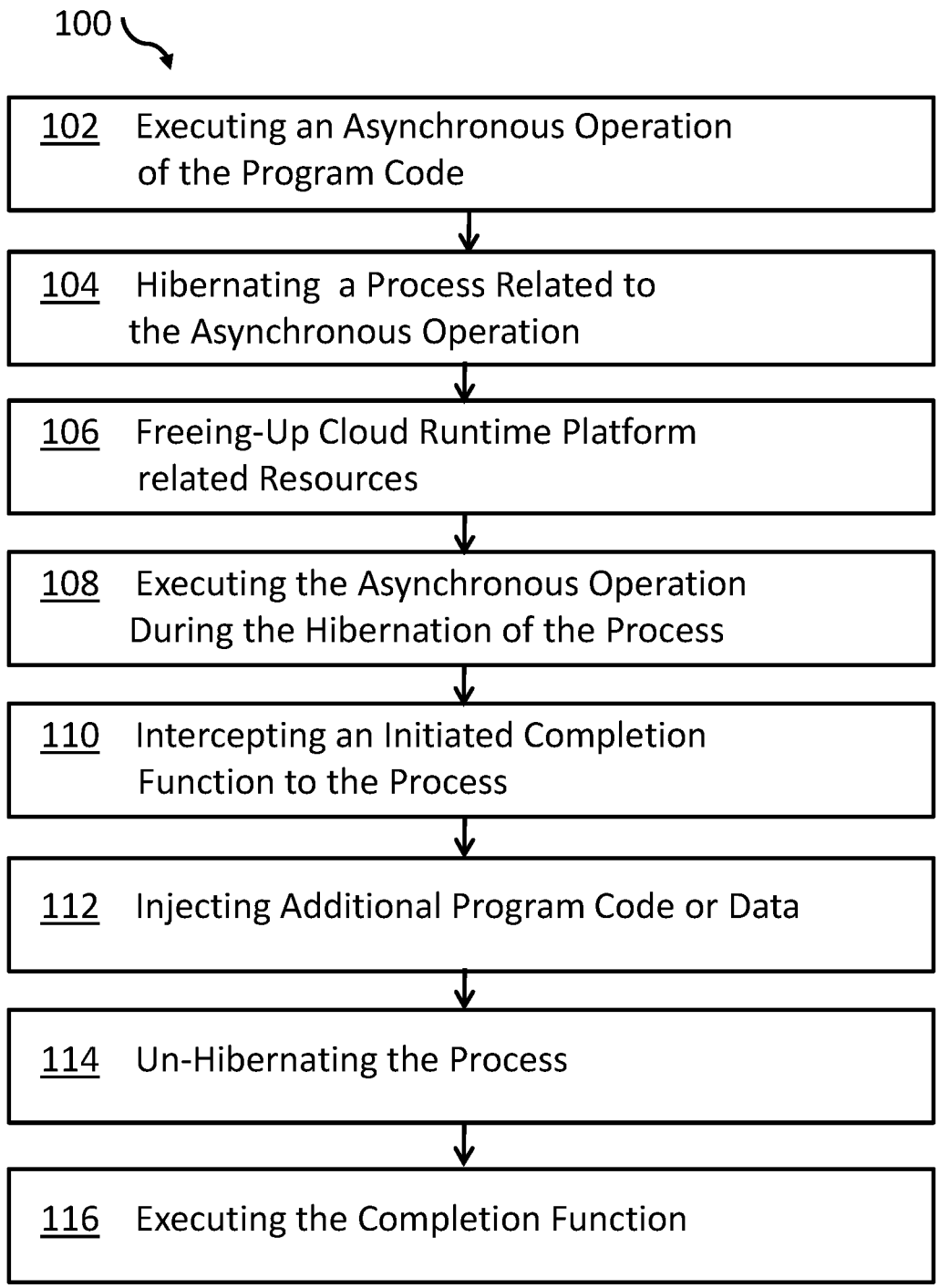
FIG. 1 is a block diagram of the computer-implemented method for execution of single-threaded, asynchronous I/O based program code on a serverless cloud runtime platform according to aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to managing asynchronous operations in cloud computing environments, and more specifically, to execution of single-threaded, asynchronous I/O based program code on a serverless cloud runtime. While the present disclosure is not necessarily limited to such applications, various aspects of the disclosure may be appreciated through a discussion of various examples using this context.

In the context of this description, the following conventions, terms and/or expressions may be used:

The term "single-threaded, asynchronous I/O based program code" may be used to refer to program code which has been written under a different programming concept which allows a stateful execution of partial functions. That is, statuses of variables may be maintained for a complete process underlying the related single-threaded, asynchronous I/O based program code. This may be typical for a programming model using complete virtual machines on a hypervisor.

The term "serverless cloud runtime platform" may be used to refer to a cloud computing execution model in which a cloud provider runs a server and dynamically manages the allocation machine resources. This cloud computing execution model may not require maintaining complete virtual machines, and the serverless code can sometimes be used in conjunction with code deployed using micro-services. However, typically, the program code for applications may be written to the purely serverless paradigm and may not rely on complete provisioned servers at all.

The term "asynchronous operation" may be used to refer to—in particular, asynchronous I/O—a form of input/output processing that may permit other processing to continue before the transmission or transaction is finished. This form of input/output processing may allow an intelligent operating system controlled partial parallelism of program related activities. Asynchronous operation may help to use the time of typically slow I/O devices, such as disks or similar devices, for program code not dependent on the I/O data.

The term "program code" may be used to refer to a digital code to be executed on a computer system, a virtual computer system, or in a serverless computing environment. Program code may be the result of a program written in a human understandable language. The program may be compiled, interpreted or translated into an intermediate code and order to be executed as program code.

The term "completion function" may be used to refer to a system call initiated at the end of the program code relating to the called asynchronous operation, such as an I/O service or I/O call.

The term "hibernating a process" (sometimes also referred to as suspension to disk) may be used to refer to powering down a computer or a related partial sub-system of the computer, while retaining its state. Upon hibernation, the computer or the related resources may save their status to non-volatile storage. Upon reception or un-hibernation, the computer is as it worked before entering hibernation. It may also be noted that, in contrast to classical hibernation processes, the content of the random access memory (e.g., the system memory related to the actual process) may not be suspended to disk in the concept disclosed herein.

The term "injecting at least one of additional program code and data" may mean that not only a result of an asynchronous operation may be returned to the calling routine but that also additional data, in particular data in the form of real data or data in form of program code, may be returned to the calling routine.

The term "un-hibernating" may be used to refer to resuming a computer operation with the same status information as before the hibernation.

The term "Node.JS" may be used to refer to the known open-source, process and platform JavaScript runtime environment that executes JavaScript code outside of a web browser. Node.JS lets developers use JavaScript to write command line tools and use it for server-side scripting, e.g., running script server-side to produce dynamic webpage content before the pages are sent to the user's web browser. Consequently, Node.JS may represent a "JavaScript everywhere" paradigm unifying web-application development around a single programming language, rather than different languages for server- and client-side scripts.

The term "JavaScript" (typically abbreviation as "JS") may be used to refer to a programming language that conforms to the ECMAscript specifications. It is a high-level, often just-in-time compiled, programming language.

The term "TypeScript" may be used to refer to an open-source programming language developed and maintained by Microsoft. The term represents a superset of JavaScript and adds optional static typing to the programming language.

The term "Golang" (or simply "Go") may be used to refer to the known statically typed, compiled programming language designed and maintained by Google. The programming language is similar to C, but with memory safety, garbage collection, structural typing and CSP-style concurrency.

The term "placement routine" may be used to refer to a system call starting the asynchronous operation, potentially with configuration parameters.

The terms "Docker," "Containerd," "LXC," "Podman Kubernetes," "Knative," "AWS Lambda," "Google Cloud Functions," "Azure Functions" and "Alibaba Cloud Function Compute" may be used to refer to frameworks for serverless computing. A version of these serverless computing frameworks may be used in the context of the proposed concept. Most of the above-mentioned names of the serverless computing frameworks are based on "containerized" service execution.

The term "cloud computing"—and equivalently the terms "cloud service environment," "cloud computing environment" or "cloud computing framework"—may in this context be interpreted as a model for enabling convenient, on-demand network access to a shared pool of configurable computing resources (e.g., networks, network bandwidth, servers, processing, memory, storage, applications, and services) that can be rapidly provisioned and released with minimal management effort or interaction with a provider of the service. This cloud model promotes availability and may include least five characteristics, three service models, and four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

It is noted that cloud software takes full advantage of the cloud paradigm by being service-oriented with a focus on statelessness (with exceptions), low coupling, modularity, and semantic interoperability.

According to some aspect of the present disclosure, a computer-implemented method for execution of single-threaded, asynchronous I/O based program code on a serverless cloud runtime platform may be provided. The method may comprise executing an asynchronous operation of the program code, where the asynchronous operation is to be completed with a completion function. The method may include hibernating a process related to the asynchronous operation and freeing-up cloud runtime platform related resources of the process excluding the related system memory. The method may also comprise executing the asynchronous operation during the hibernation of the process, intercepting an initiated completion function to the process after a completion of the asynchronous operation, and injecting at least one of additional program code and data into the completion function.

Furthermore, the method may comprise un-hibernating the process and reallocating freed-up cloud runtime platform related resources of the process, and executing the completion function returning result data of the asynchronous operation and the at least one of additional program code and data to the process, thereby enabling the execution of the single-threaded, asynchronous I/O based program code on the serverless cloud runtime platform.

According to another aspect of the present disclosure, a runtime system for an execution of single-threaded, asynchronous I/O based program code on a serverless cloud runtime platform may be provided. The system may comprise a memory and a processor in communication with the memory. The processor may be configured to perform operations comprising: executing an asynchronous operation of the program code, where the asynchronous operation is to be completed with a completion function; hibernating a process related to the asynchronous operation; and freeing-up cloud runtime platform related resources of the process excluding the related system memory.

In some embodiments, the processor may be configured to perform operations comprising: executing the asynchronous operation during the hibernation of the process, intercepting an initiated completion function to the process after a completion of the asynchronous operation, and injecting at least one of additional program code and data into the completion function.

In some embodiments, the processor may be configured to perform operations comprising: un-hibernating the process and reallocating freed-up cloud runtime platform related resources of the process. In some embodiments, the processor may be configured to perform operations comprising: executing the completion function, returning result data of the asynchronous operation and at least one of the additional program code and data to the process, thereby enabling the execution of the single-threaded, asynchronous I/O based program code on the serverless cloud runtime platform.

The proposed computer-implemented method for execution of single-threaded, asynchronous I/O based program code on a serverless cloud runtime platform may offer multiple advantages, contributions, and technical effects.

As an example, a single-threaded program code of any type, e.g., a Node.JS program, may automatically be mapped to a serverless compute model by mapping execution slices to serverless invocations transparently. Hence, the present disclosure may allow an unmodified JavaScript program to be executed in the serverless environment for which it was not designed initially. The present disclosure brings the advantages of serverless computing also to more traditional single-threaded and more or less linearly designed program code.

The requirement to rewrite and redesign the single-threaded program code for a serverless computing environment has been eliminated so that from a user perspective the program code can now run indefinitely, while from the perspective of serverless computing it is still the pure serverless application. This provides two advantages: first, single-threaded programming languages, such as Node.JS and second, the advantage of serverless computing requiring less resources.

The methods of the present disclosure may also allow injecting arbitrary data and program logic into the original program code without the need to recompile or restructure the original single-threaded program. Examples of injected data may include (but are not limited to): cryptographic signatures signing the current data heap and profiling data which aids a performance analysis of the program code and in turn optimizes the placement dependent on the resulting load profile to specific serverless runtimes and clusters. Examples of injected program code may also include (but are not limited to): sending program execution status to an audit logging service.

Another advantage of the methods of the present disclosure is the ability to resume the interrupted single-threaded program on another cloud cluster or region, dependent on the availability of compute resources.

In some embodiments, the single-threaded, asynchronous I/O based program code may be written in a programming language selected from Node.JS, JavaScript, TypeScript and Golang or a comparable programming language. Thus, the present disclosure may be used together with almost any programming language supporting single-threaded, a synchronous I/O based programming styles.

In some embodiments, the un-hibernating—or resuming—may comprise executing a placement routine for resources for the process. Therefore, the resources required by the initiating program process that initiated the asynchronous operation may be re-established, thereby supporting the concept of serverless computing.

In some embodiments, the placement routine may be a function of a geographic availability of resources of the cloud runtime platform. Hence, by selecting useful configuration parameters for the placement routine, one may influence the geographic region in which the related service will be executed. This makes it possible to reduce network latency due to long distances between the calling and the called service.

In some embodiments, the placement routine may also comprise determining the resource placement of the process to be un-hibernated based on the location of the asynchronous operation. The location may be determined based on geographic coordinates, e.g., the resource placement may be chosen "close by" in order to avoid long-distance network connections between related services.

In some embodiments, the method may also comprise determining a resource placement for resources required by the asynchronous operation based on the location of the hibernated process. Geographic coordinates may also play a major role. This may guarantee that both services (in particular, the calling and the called) may run in the same cloud computing center.

In some embodiments, the serverless cloud runtime platform may be based on one of the following technologies: Docker, Containerd, Linux Containers, Podman Kubernetes, Knative, AWS Lambda, Google Cloud Functions, Azure Functions and Alibaba Cloud Function Compute. Additionally, other, similar serverless cloud runtime platforms may be used. Hence, the proposed concept may support basically any serverless cloud runtime framework.

In some embodiments, the asynchronous operation may be a long running asynchronous input/output (I/O) operation (e.g., a call to a filesystem, a database, or similar) a timer operation, or a wait operation for an input operation. However, it is noted that this may not apply to promises directly in serverless computing frameworks but to those comprising input/output. The same may apply to asynchronous wait operations; they are typically mapped to promises.

In some embodiments, the method may also comprise determining, by a placement routine having initiated (e.g., triggered) the execution of the asynchronous operation, a resource placement for the process to be un-hibernated based on the data classification associated with the asynchronous operation and the respective parameters. Thus, not only the code itself and potential metadata, but also the type of data associated with the asynchronous operation may be used to control the functioning of the resource placement. This may allow a fine-grained management of the stateless computing framework when used in the context of single-threaded, asynchronous I/O based program code.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

In the following, a detailed description of the figures will be given. All instructions in the figures are schematic. First, a block diagram of an embodiment of the computer-implemented method for an execution of single-threaded, asynchronous I/O based program code on a serverless cloud runtime platform is given. Afterwards, further embodiments, as well as embodiments of the runtime system for an execution of single-threaded, asynchronous I/O based program code on a serverless cloud runtime platform, will be described.

Referring to FIG. 1, which illustrates a block diagram of an embodiment of the computer-implemented method 100 for execution of single-threaded, asynchronous I/O based program code (e.g., Node.JS, JavaScript, TypeScript or Golang) on a serverless cloud computing runtime platform (e.g., Docker). The program code may have been compiled, and it may be interpretable code or program code based on an intermediate code.

In some embodiments, method 100 begins at operation 102. At operation 102, an asynchronous operation of the program code is executed. Thereby, the asynchronous operation is to be completed with a completion function. Alternatively, a callback function may also be possible.

In some embodiments, method 100 proceeds to operation 104. At operation 104, a process related to the asynchronous operation is hibernated. In some embodiments, method 100 proceeds to operation 106 where cloud runtime platform related resources of the process, excluding the related system memory (e.g., RAM), are freed-up or released. Hence, data stored in the related system memory will stay active and will, in case of executable code, be executed. It is noted that at least a part of the cloud runtime platform related resources of the process may be released or freed up. It is not required that all resources are released automatically.

In some embodiments, method 100 proceeds to operation 108 where the asynchronous operation during the hibernation of the process is executed. The asynchronous operation may be, for example, a system call potentially on another node of another cluster located at a different geographical position (e.g., typically a different cloud computing center).

In some embodiments, method 100 proceeds to operation 110. At operation 110, an initiated completion function, or a completion function call, to the process after a completion of the asynchronous operation is intercepted. In some embodiments, method 100 proceeds to operation 112. At operation 112, the interception can be used for injecting additional program code or data, or both, into the completion function, such that it is also returned to the calling program.

In some embodiments, method 100 proceeds to operation 114. At operation 114, the process is un-hibernated and freed-up cloud runtime platform related resources of the process are reallocated. In some embodiments, method 100 proceeds to operation 116. At operation 116, the completion function returning result data of the asynchronous operation and the at least one of additional program code and data to the process are executed, thereby enabling the execution of the single-threaded, asynchronous I/O based program code on the serverless cloud runtime platform. This way, advantageously "old" single-threaded program code, in particular, program code for long transactions may be operated without any modification in stateless cloud computing frameworks.

Figure 2:
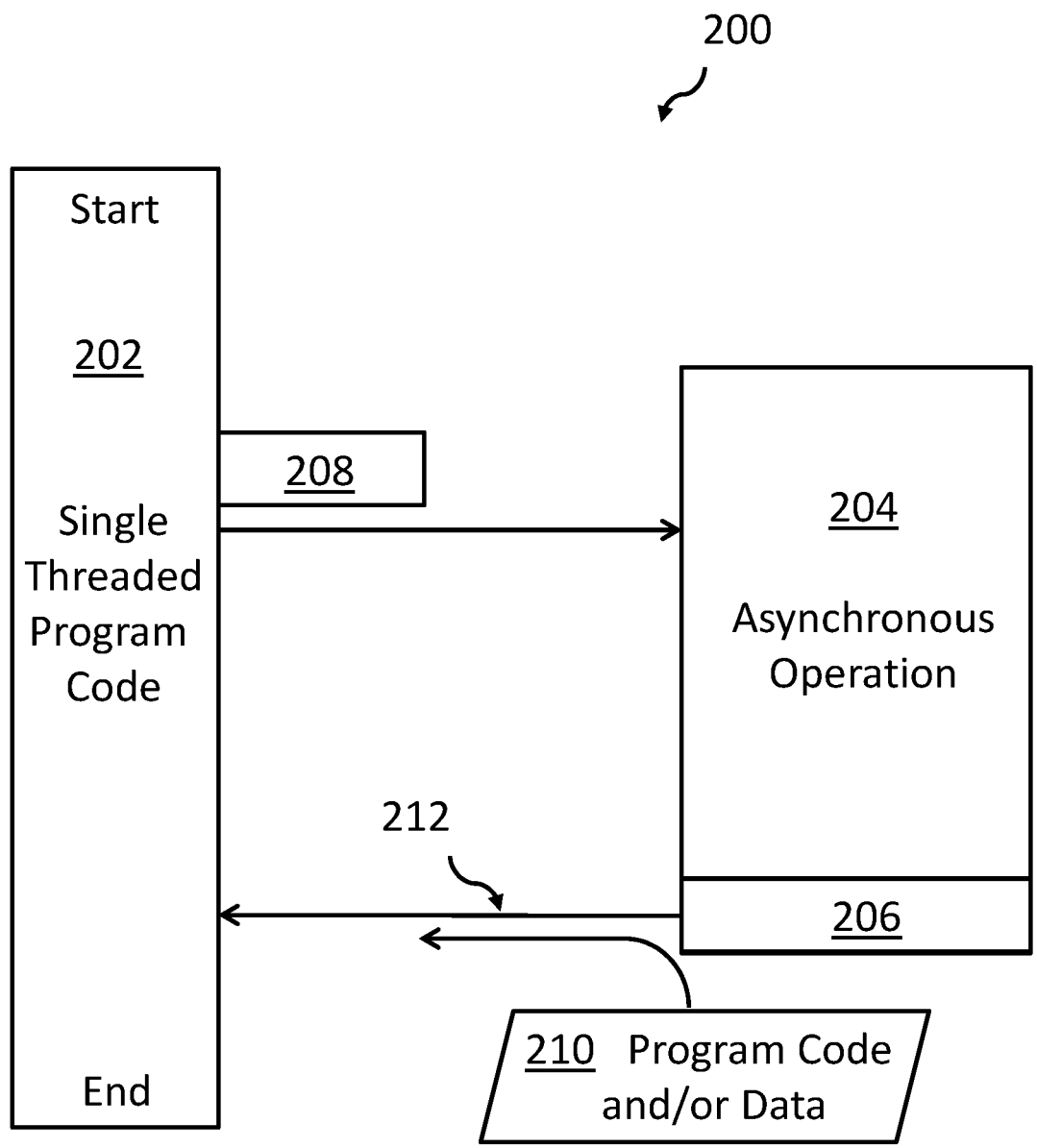
FIG. 2 is a block diagram components of the computer-implemented method for execution of single-threaded, asynchronous I/O based program code on a serverless cloud runtime platform according to aspects of the present disclosure.

Referring now to FIG. 2, which illustrates a block diagram of an embodiment 200 of involved components and interactions between them. On the left inside, block 202 represents a single-threaded program code with a start and an end. However, it may also be a looped program, which may only be terminated by user input, or by an operating system-based service.

During the operation of the program 202—with the help of a placement routine 208—an asynchronous operation, like an asynchronous I/O operation 204, is started. Several parameter values may be tuned to control the execution of the asynchronous operation. The operating system process (not shown) relating to the single-threaded program code 202—apart from the system memory (e.g., the related RAM)—may be hibernated during the execution of the asynchronous operation 204.

At the end of the asynchronous operation 204, a completion function 206 may be executed, e.g., in the form of another system call. However, the results of the asynchronous operation 204 are not returned directly to the single-threaded program code 204, and the respective process. Instead, the completion function is interrupted when attempting to return the result data from the other cross operation 204 to the program code 202, and additional program code and/or data 210 are injected in the return path 212.

This way, before un-hibernating the single-threaded program code 202—or better the related operating system process—additional function points can be injected before the single-threaded program code continues its execution.

Figure 3:
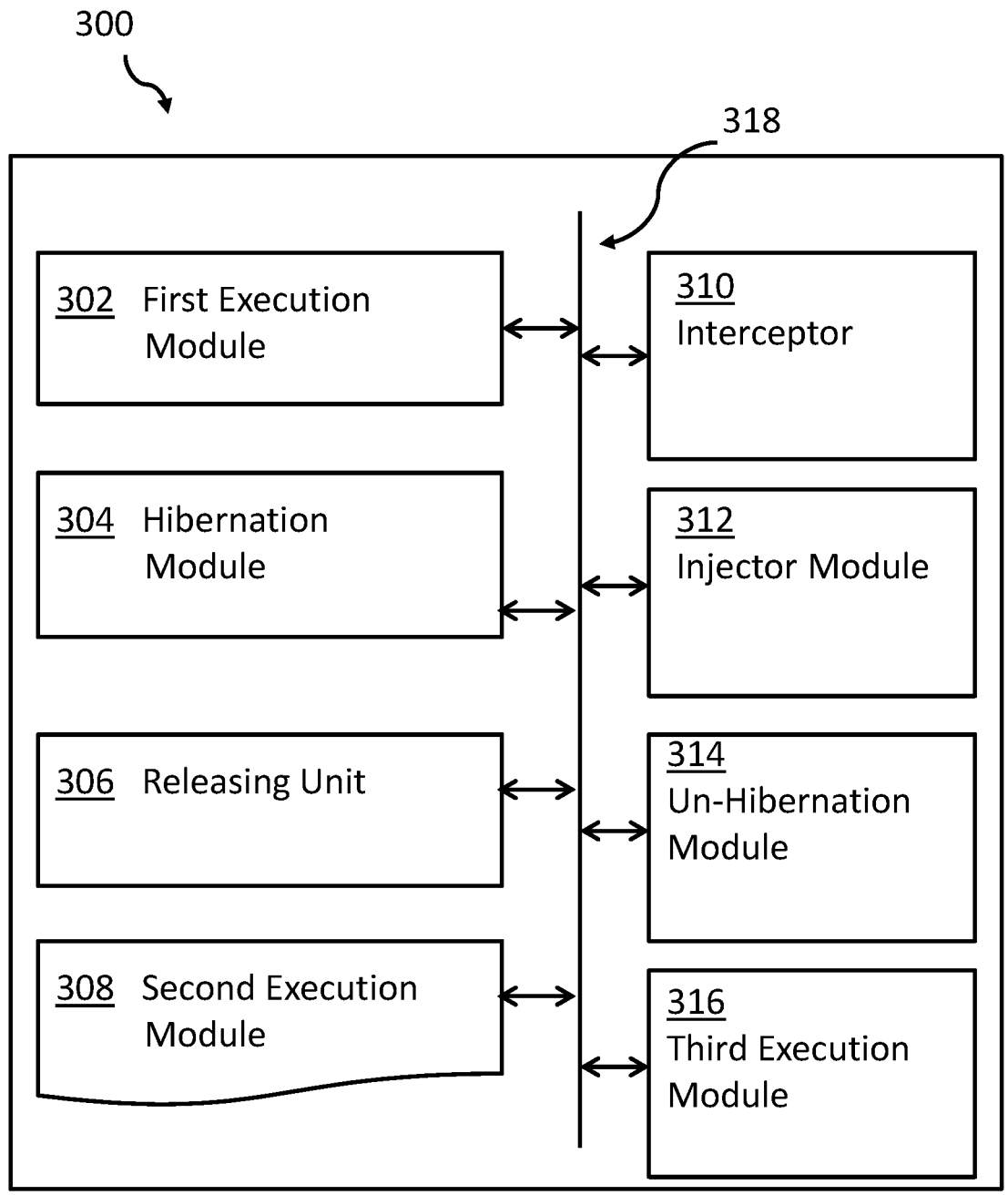
FIG. 3 is a block diagram of the runtime system for execution of single-threaded, asynchronous I/O based program code on a serverless cloud runtime platform according to aspects of the present disclosure.

Referring now to FIG. 3, which illustrates a block diagram of an embodiment of the runtime system 300 for execution of single-threaded, asynchronous I/O based program code on a serverless cloud runtime platform. The runtime system comprises a first execution module 302 adapted for executing an asynchronous operation of the program code. Thereby, the asynchronous operation is to be completed with a completion function. The runtime system also comprises a hibernation module 304 adapted for hibernating a process related to the asynchronous operation and a releasing unit 306 adapted for freeing-up cloud runtime platform related resources of the process excluding the related system memory.

Additionally, the runtime system 300 also comprises a second execution module 308 adapted for executing the asynchronous operation during the hibernation of the process, an interceptor 310 adapted for intercepting an initiated completion function to the process after a completion of the asynchronous operation, and an injector module 312 adapted for injecting at least one of additional program code and data into the completion function.

The runtime system 300 also comprises an un-hibernation module 314 adapted for un-hibernating the process and reallocating, freeing-up or releasing cloud runtime platform related resources of the process. The runtime system 300 also comprises a third execution module 316 adapted for executing the completion function returning a result of the asynchronous operation data and at least one of the additional program code and the data to the process, thereby enabling the execution of the single-threaded, asynchronous I/O.

It is noted that the units and modules of the runtime system 300 are communicatively coupled for signal exchanges. Thus, the first execution module 302, the hibernation module 304, the releasing unit 306, the second execution module 308, the interceptor 310, the injector module 312, the un-hibernation module 314, and the third execution module 316 may be linked to each other in such a way. Alternatively, these units in modules may be connected to a runtime system internal bus system 318.

Figure 4A:
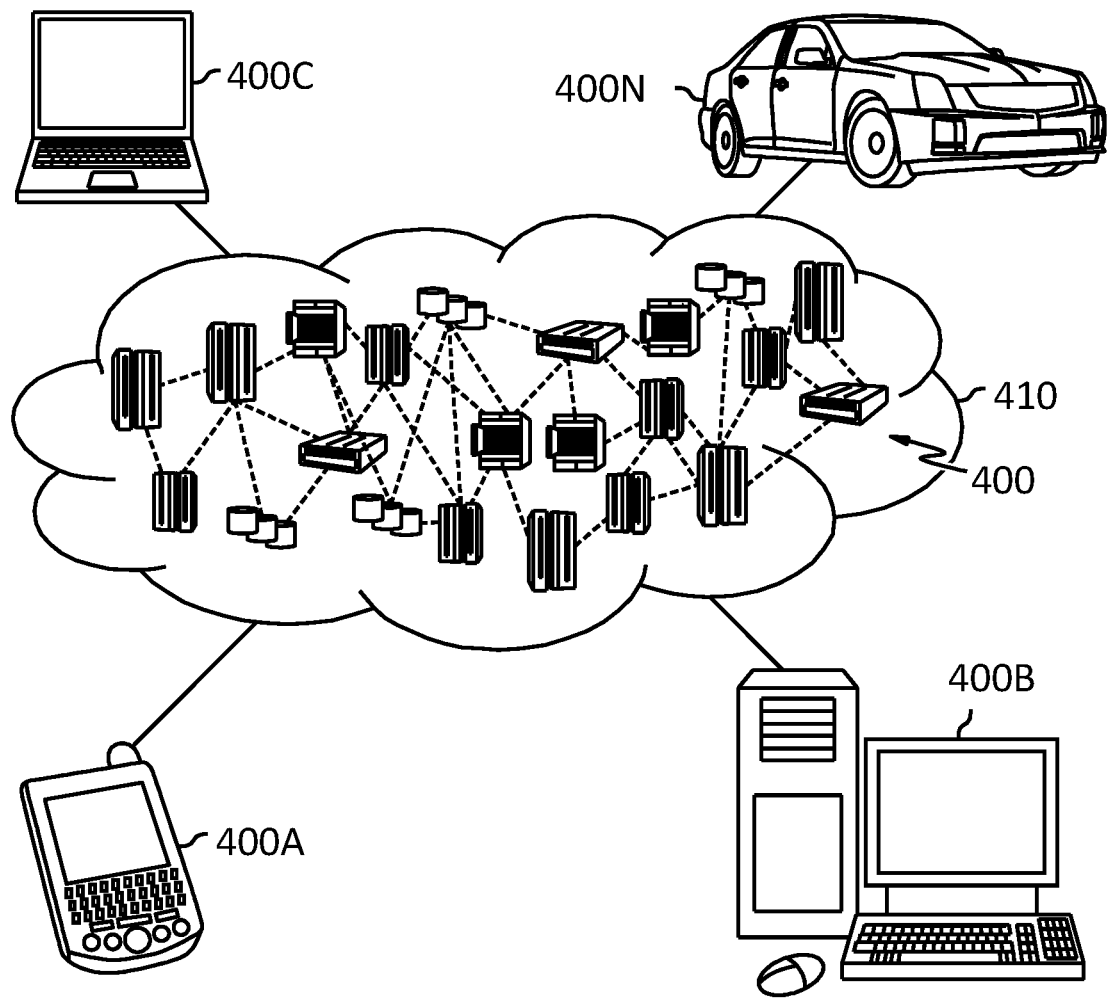
FIG. 4A illustrates a cloud computing environment, in accordance with aspects of the present disclosure.

Referring now to FIG. 4A, which illustrates a cloud computing environment 410. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4A are intended to be illustrative only and that computing nodes 400 and cloud computing environment 410 can communicate with any type of computerized device over any type of network and/or network addressable connection (e.g., using a web browser).

Figure 4B:
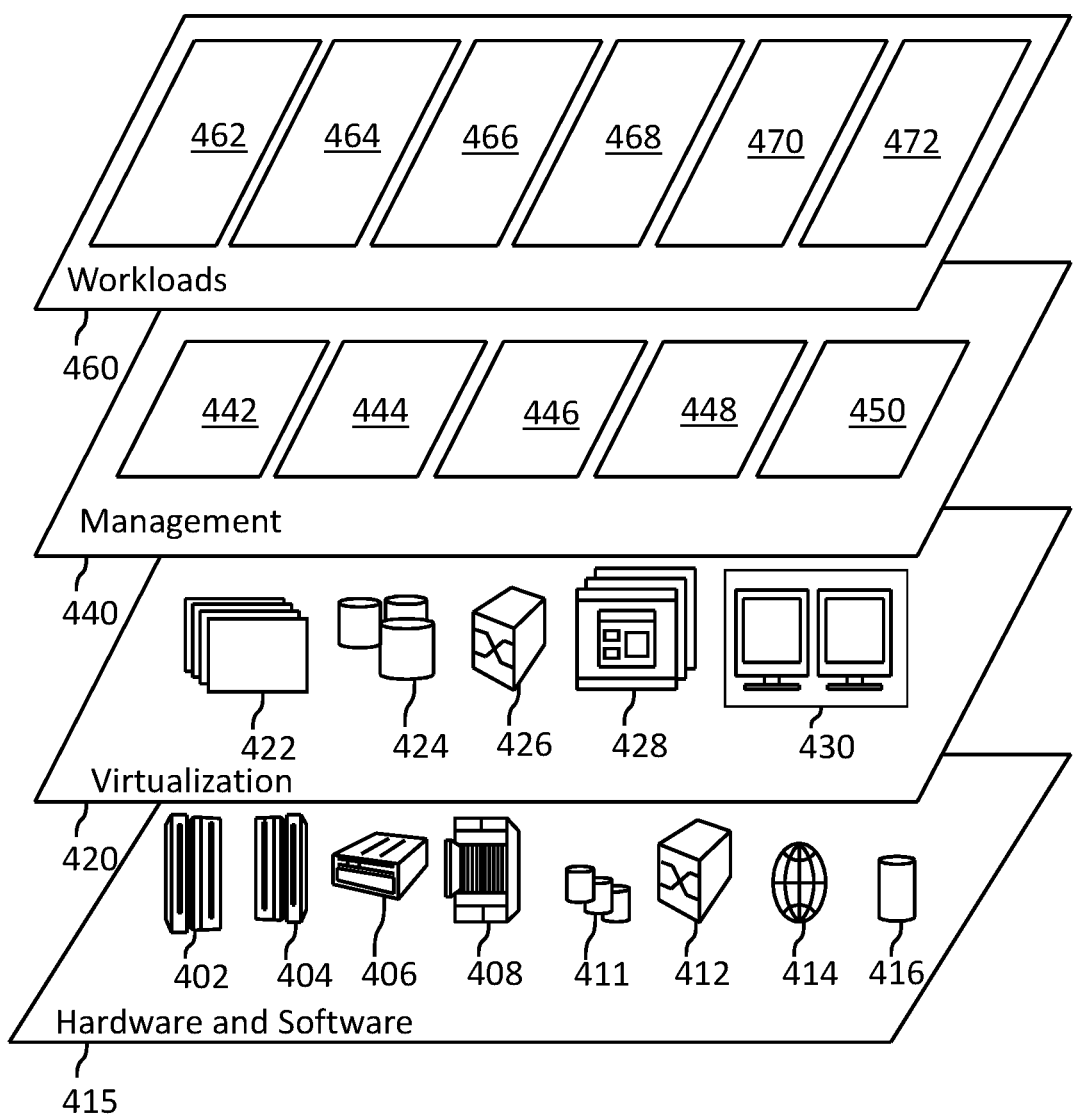
FIG. 4B illustrates abstraction model layers, in accordance with aspects of the present disclosure.

FIG. 4B illustrates a set of functional abstraction layers provided by cloud computing environment 410 (FIG. 4A). It should be understood in advance that the components, layers, and functions, shown in FIG. 4B, are intended to be illustrative only, and embodiments of the disclosure are not limited thereto. As depicted below, the following layers and corresponding functions are provided: Hardware and software layer 415 includes hardware and software components. Examples of hardware components include: mainframes 402; servers 406; RISC (Reduced Instruction Set Computer) architecture based servers 404; blade servers 408; storage devices 411; networks and networking components 412. In some embodiments, software components include network application server software 414 and/or database software 416.

Virtualization layer 420 provides an abstraction layer from which the following examples of virtual entities may be provided: virtual servers 422; virtual storage 424; virtual networks 426, including virtual private networks; virtual applications and operating systems 428; and virtual clients 430.

In one example, management layer 440 may provide the functions described below. Resource provisioning 442 provides dynamic procurement of computing resources and other resources that are utilized to perform tasks within the cloud computing environment. Metering and pricing 444 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 446 provides access to the cloud computing environment for consumers and system administrators. Service level management 448 provides cloud computing resource allocation and management such that required service levels are met. Service Level Agreement (SLA) planning and fulfillment 450 provide pre-arrangement for, and procurement of, cloud computing resources for which a future requirement is anticipated in accordance with an SLA.

Workload layer 460 provides examples of functionality for which the cloud computing environment may be utilized. Examples of workloads and functions which may be provided from this layer include: mapping and navigation 462; software development and lifecycle management 464; virtual classroom education delivery 466; data analytics processing 468; transaction processing 470; and runtime system 472 (compare FIG. 3, runtime system 300).

Embodiments of the disclosure may be implemented together with virtually any type of computer, regardless of the platform being suitable for storing and/or executing program code.

Figure 5:
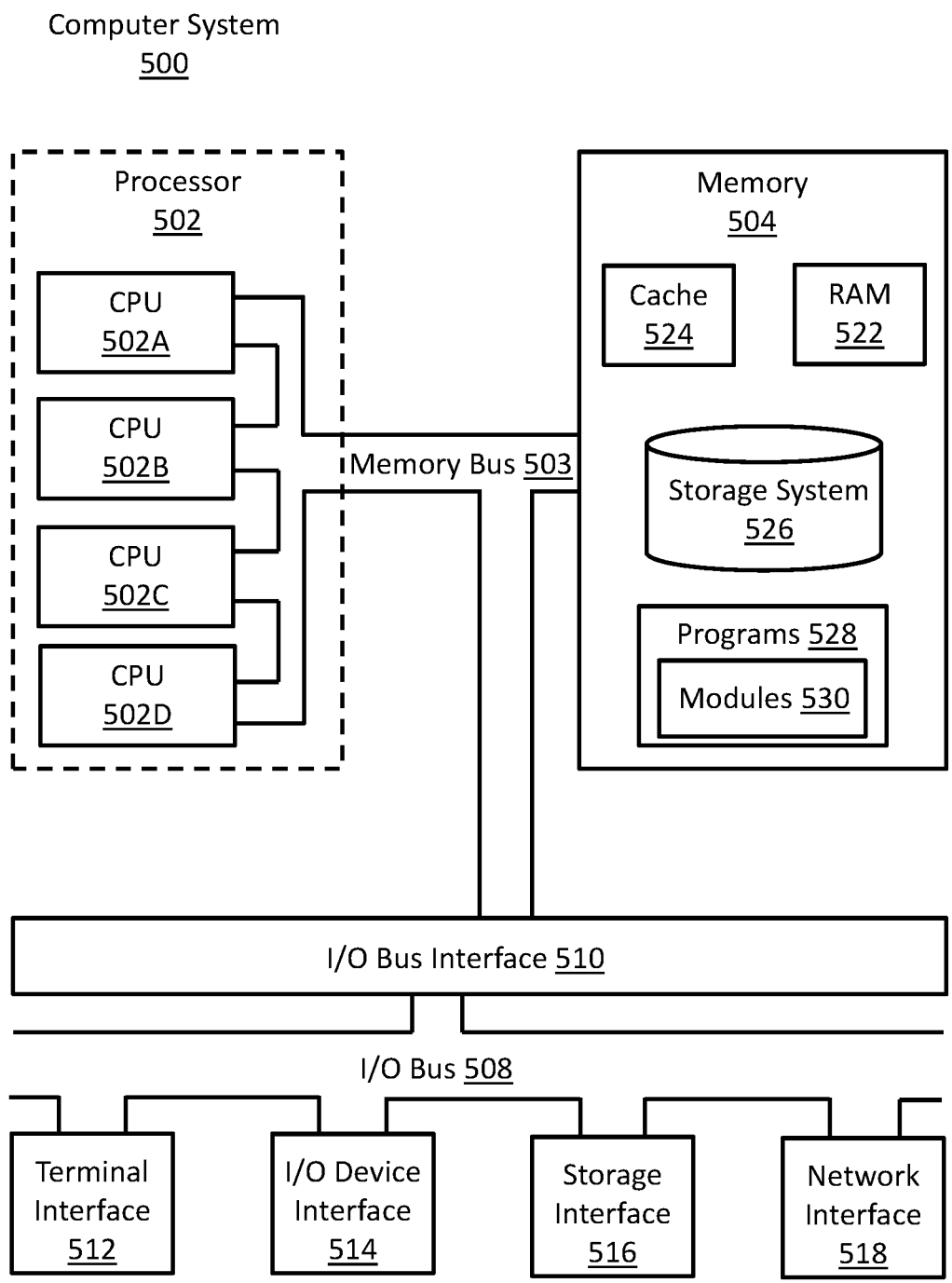
FIG. 5 illustrates a high-level block diagram of an example computer system that may be used in implementing one or more of the methods, tools, and modules, and any related functions, described herein, in accordance with aspects of the present disclosure.

Referring now to FIG. 5, which illustrates a high-level block diagram of another exemplary computer system 500 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 500 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 500 may contain one or more general-purpose programmable central processing units (CPUs) 502A, 502B, 502C, and 502D, herein generically referred to as the CPU 502. In some embodiments, the computer system 500 may contain multiple processors typical of a relatively large system; however, in other embodiments the computer system 500 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 500 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 500 may be a multi-user mainframe computer system, a single-user system, or a server computer or similar device that has little or no direct user interface, but receives requests from other computer systems (clients). Further, in some embodiments, the computer system 500 may be implemented as a desktop computer, portable computer, laptop or notebook computer, tablet computer, pocket computer, telephone, smartphone, network switches or routers, or any other appropriate type of electronic device.

It is noted that FIG. 5 is intended to depict the representative major components of an exemplary computer system 500. In some embodiments, however, individual components may have greater or lesser complexity than as represented in FIG. 5, components other than or in addition to those shown in FIG. 5 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present disclosure may be embodied as a system, a method, and/or a computer program product at any possible technical detail level of integration. The computer program product may include a computer readable storage medium (or media) having computer readable program instructions thereon for causing a processor to carry out aspects of the present disclosure.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++ or the like, and procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions. The terminology used herein is for the purpose of describing particular embodiments only and is not intended to limit the disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the disclosure in the form disclosed. Many modifications and variations will be apparent to those of ordinary skills in the art without departing from the scope and spirit of the disclosure. The embodiments are chosen and described in order to best explain the principles of the disclosure and the practical application, and to enable others of ordinary skills in the art to understand the disclosure for various embodiments with various modifications, as are suited to the particular use contemplated.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method for an execution of single-threaded, asynchronous I/O based program code on a serverless cloud runtime platform, the method comprising:
   executing an asynchronous operation of the program code, wherein the asynchronous operation is to be followed by an initiated completion function;
   hibernating a process related to the asynchronous operation;
   freeing-up cloud runtime platform related resources of the process, excluding a related system memory of the process;
   executing the asynchronous operation while hibernating the process;
   intercepting the initiated completion function to the process after a completion of the asynchronous operation;
   injecting at least one of an additional program code and a data into the intercepted completion function;
   un-hibernating the process and reallocating the freed-up cloud runtime platform related resources of the process; and
   executing the injected completion function returning result data of the asynchronous operation and the at least one of the additional program code and the data to the process, wherein the single-threaded, asynchronous I/O based program code on the serverless cloud runtime platform is executed.

2. The method of claim 1, wherein un-hibernating the process comprises:
   executing a placement routine for resources for the process.

3. The method of claim 2, wherein the placement routine is a function of a geographic availability of resources of the cloud runtime platform.

4. The method of claim 3, wherein the placement routine further comprises:
   determining a resource placement of the process to be un-hibernated based on a location of the asynchronous operation.

5. The method of claim 1, further comprising:
   determining a resource placement for resources required by the asynchronous operation based on a location of the hibernated process.

6. The method of claim 1, wherein the asynchronous operation is implemented as a service by said cloud runtime platform.

7. The method of claim 1, the method further comprising:
   determining, by a placement routine having initiated the execution of the asynchronous operation, a resource placement for the process to be un-hibernated based on the data classification associated with the asynchronous operation and respective parameters.

8. A runtime system for an execution of single-threaded, asynchronous I/O based program code on a serverless cloud runtime platform, the runtime system comprising:

a memory: and a processor in communication with the memory, the processor configured to perform operations comprising:

executing an asynchronous operation of the program code, wherein the asynchronous operation is to be followed by an initiated completion function;

hibernating a process related to the asynchronous operation;

freeing-up cloud runtime platform related resources, excluding a related system memory, of the process;

executing the asynchronous operation during a hibernation of the process;

intercepting the initiated completion function to the process after a completion of the asynchronous operation;

injecting at least one of additional program code and data into the completion function;

un-hibernating the process and reallocating the freed-up cloud runtime platform related resources of the process; and executing the injected completion function returning a result of the asynchronous operation data and at least one of the additional program code and the data to the process, wherein the single-threaded, asynchronous I/O based program code on the serverless cloud runtime platform is executed.

9. The runtime system of claim 8, wherein un-hibernating the process comprises:

executing a placement routine for resources for the process.

10. The runtime system of claim 9, wherein the placement routine is a function of a geographic availability of resources of the cloud runtime platform.

11. The runtime system of claim 9, wherein the placement routine further comprises:

determining a resource placement of the process to be un-hibernated based on a location of the asynchronous operation.

12. The runtime system of claim 8, wherein the processor is further configured to perform operations comprising:

determining a resource placement for resources required by the asynchronous operation based on a location of the hibernated process.

13. The runtime system of claim 8, wherein the asynchronous operation is implemented as a service by said cloud runtime platform.

14. A computer program product for an execution of single-threaded, asynchronous I/O based program code on a serverless cloud runtime platform, the computer program product comprising a computer readable storage medium having program instructions embodied therewith, the program instructions being executable by one or more computing systems or controllers to perform operations, the operations comprising:

executing an asynchronous operation of the program code, wherein the asynchronous operation is to be followed by an initiated completion function;

hibernating a process related to the asynchronous operation;

freeing-up cloud runtime platform related resources of the process, excluding a related system memory of the process;

executing the asynchronous operation during a hibernation of the process;

intercepting the initiated completion function to the process after a completion of the asynchronous operation;

injecting at least one of additional program code and data into the intercepted completion function;

un-hibernating the process and reallocate the freed-up cloud runtime platform related resources of the process, and executing the injected completion function returning a result of the asynchronous operation data and the at least one of the additional program code and the data to the process, wherein the single-threaded, asynchronous I/O based program code on the serverless cloud runtime platform is executed.

15. The computer program product of claim 14, wherein un-hibernating the process comprises:

executing a placement routine for resources for the process.

16. The computer program product of claim 15, wherein the placement routine is a function of a geographic availability of resources of the cloud runtime platform.

17. The computer program product of claim 15, wherein the placement routine further comprises:

determining a resource placement of the process to be un-hibernated based on a location of the asynchronous operation.

18. The computer program product of claim 14, wherein the controllers are further configured to perform operations comprising:

determining a resource placement for resources required by the asynchronous operation based on a location of the hibernated process.

\* \* \* \* \*